(12) United States Patent
Gabet et al.

(10) Patent No.: US 6,597,208 B1
(45) Date of Patent: Jul. 22, 2003

(54) DIGITAL SYNTHESIZER WITH COHERENT DIVISION

(75) Inventors: Pascal Gabet, Chaville (FR); Jean-Luc De Gouy, Briis sous Forges (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/926,587

(22) PCT Filed: May 16, 2000

(86) PCT No.: PCT/FR00/01309

§ 371 (c)(1),
(2), (4) Date: Nov. 21, 2001

(87) PCT Pub. No.: WO00/72120

PCT Pub. Date: Nov. 30, 2000

(30) Foreign Application Priority Data

May 21, 1999 (FR) .............................................. 99 06514

(51) Int. Cl.$^7$ ................................................ H03D 3/24
(52) U.S. Cl. .................... 327/107; 327/105; 327/106
(58) Field of Search ................. 327/105, 106, 327/107, 156; 341/143, 144

(56) References Cited

U.S. PATENT DOCUMENTS

| | | | |
|---|---|---|---|
| 5,729,182 A | 3/1998 | Fousset et al. ................ 331/17 |
| 5,977,804 A | * 11/1999 | Beech ........................ 327/107 |
| 6,075,474 A | 6/2000 | Gabet et al. ................ 341/143 |
| 6,107,843 A | 8/2000 | de Gouy et al. ............. 327/105 |
| 6,191,657 B1 | 2/2001 | Brunet et al. ............... 331/1 A |
| 6,262,604 B1 | 7/2001 | Gabet et al. ................ 327/107 |
| 6,307,441 B1 | * 10/2001 | Sharpe ....................... 327/106 |
| 6,307,492 B1 | 10/2001 | Berranger et al. .......... 341/131 |

OTHER PUBLICATIONS

U.S. patent application Ser. No. 09/926,587, filed Nov. 21, 2001, pending.
U.S. patent application Ser. No. 10/042,199, filed Jan. 11, 2002, pending.
U.S. patent application Ser. No. 08/467,786, filed Jun. 21, 1995, pending.
U.S. patent application Ser. No. 09/786,349, filed Mar. 12, 2001, allowed.
U.S. patent application Ser. No. 09/830,150, filed Apr. 23, 2001, pending.

* cited by examiner

*Primary Examiner*—Dinh T. Le
(74) *Attorney, Agent, or Firm*—Oblon, Spivak, McClelland, Maier & Neustadt, P.C.

(57) ABSTRACT

A direct digital frequency-synthesis device includes a modulo-M coherent accumulator that generates a first phase law from a frequency-control word. A table, addressed by a second phase law derived from the first phase law, generates a digital sinusoidal signal. A digital/analog converter converts the digital sinusoidal signal into an analog sinusoidal signal. A filter filters the analog sinusoidal signal. And, a divider divides the filtered signal. The divider has a lower order than M and has a synchronization input driven by a synchronization pulse for re-synchronizing the signal after division, the synchronization pulse being derived from the phase law. Such a device may find particular application to digital synthesizers for radar.

12 Claims, 7 Drawing Sheets

DIGITAL SYNTHESIZER WITH COHERENT DIVISION

BACKGROUND OF THE INVENTION

1. Field of the Invention

The present invention relates to a device for digital frequency synthesis, and in particular to a device performing direct digital frequency synthesis.

2. Description of the Background Art

It makes it possible particularly to generate analog signals at a defined frequency, especially in a wave train, while preserving phase coherence between two bursts of the wave train at the same frequency. Two bursts of the wave train, at the same frequency, are said to be coherent if, after having artificially extended the duration of the first burst until the second burst, the phase of the second burst is the same as the phase of the first burst.

Digital synthesis is a frequency-synthesis technique which consists in calculating digitally, at regular instants, the value of the samples of the signal to be generated and in converting these samples by means of a digital/analog converter in order to generate an analog signal. Digital/analog converters are commonly designated by the abbreviation DAC according to the terminology of the art.

The frequency synthesizers obtained by this technique are very attractive as regards their volume, their weight and their energy consumption, since they can benefit from substantial integration. Their other advantages are, especially, very high resolution and very short switching times.

The French patent application No. 97 05 625, published under No. 27 63 196, filed in the name of the Applicant, has as its subject a certain type of frequency synthesizer. In such a synthesizer, the frequency synthesis is not direct since the synthesizer includes a phase loop.

The known direct digital synthesizers derive a phase law from frequency information. The phase law is derived by an accumulator. A table transforms the phase law into a sinusoidal digital signal. The sinusoidal digital signal is converted into an analog signal by a digital/analog converter. The use of a digital/analog converter introduces defects which induce the creation of parasitic spectral components. The defects are related, on the one hand, to the quantisation of the signal and, on the other hand, to the non-linearities of the DAC. In particular:

the DAC is limited to a number of bits NB which, in general, is smaller than the number of bits N with which the table calculates the sinusoidal digital signal. The change from N bits to NB bits generates a quantisation error which is conveyed by the presence of parasitic spectral lines on the signal leaving the DAC, because of the quantisation at the input to the DAC, the transfer function of the DAC, that is to say the output voltage as a function of the digital input words, is a staircase function. The differences in height between the steps of the staircase and the existence of irregular phenomena during the transition between steps induce non-linearities. These non-linearities are added to the abovementioned quantisation error.

One known method for enhancing the spectral purity of this type of synthesizer consists in dividing the signal output by the digital/analog converter. The division is preceded by a filtering of the spectral components introduced by the sampling. This method has the major drawback of losing phase coherence because of the division operation.

SUMMARY OF THE INVENTION

One object of the invention is to remedy this drawback. By virtue of the use of a coherent accumulator and of a synchronizable divider, a device according to the invention enhances the spectral purity, by dividing the output signal from the digital synthesizer, while preserving the phase coherence, by synchronizing the divider with a synchronization signal originating from the coherent accumulator. Thus, the device preserves phase coherence between the bursts of a wave train at the same frequency, even if, between these bursts, the synthesizer has sent out a burst the frequency of which is different.

A direct digital frequency-synthesis device, according to the invention, comprises:

a modulo-M coherent accumulator, for generating a first phase law from a frequency-control word, a table, addressed by a second phase law derived from the first phase law, for generating a digital sinusoidal signal, a digital/analog converter for converting the digital sinusoidal signal into an analog sinusoidal signal, a filter for filtering the analog sinusoidal signal, and a divider, of some lower order than M, for dividing the filtered signal, the divider having a synchronization input driven by a synchronization pulse for re-synchronizing the signal after division, the synchronization pulse being derived from the phase law.

In a first embodiment, the invention consists in using the high-order bit of the phase law originating from the coherent accumulator, possessing P1 supplementary bits by comparison with the usual devices, in order to synchronize the divider. The said divider, of order $2^{P1}$, participates in the purification of the spectrum of the signal originating from the digital/analog converter.

In another embodiment, the invention consists in separating the coherent accumulator into several coherent accumulators, of lower modulo Mi than the modulo M, in such a way as to form a modulo basis in a residue-type numbering system, the outputs of the accumulators representing the phase of the signal in the basis of the modulos. A first division means, operating according to this residue-type numbering system, makes it possible to adapt the phase law; the adaptation makes it possible to go from a first representation on the basis of modulos of the accumulators to a second representation on a second modulo basis compatible with the resolution of the table, in order to be able to address the table. A second division means, operating according to this residue-type numbering system, makes it possible to adapt the phase law a second time; the adaptation makes it possible to go from the second representation to a third representation on a third modulo basis. The third modulo basis contains a single modulo equal to the division order. As in the first embodiment, a means extracts a high-order bit, of a coherent signal, in order to synchronize the divider. In this embodiment of the invention, the high-order bit is extracted from the third representation of the phase law.

The signal for synchronizing the divider is preferably a pulse; this pulse is generated by the differentiation of the falling edge of the high-order bit. The high-order bit is generally designated by the acronym MSB, the abbreviation of the terms Most Significant Bit. The pulse performs a periodic resetting of the divider. Upon a change of frequency, which corresponds to a change of burst frequency, the synchronization pulse ensures the correct placing of the phase cycle of the divider, by imposing the instant of the phase zero of the divider. Thus, the phase cycle of the divider does not depend on the history of the frequency changes as in the known devices; it depends on the phase of the high-order bit which is itself coherent, since it originates from the coherent accumulator.

Thus, when the frequency is steady, the cycle of the phase states of the divider is also steady. This is because the synchronization pulse occurs during the zero-phase state of the divider; the synchronization pulse has no effect on the progress of the phase states of the divider. Consequently, the synchronization pulse can even exhibit a temporal variation without that having any incidence on the coherence or on the spectral purity of the output signal from the divider, on condition that this temporal variation remains less than the duration of the zero-phase state of the divider.

BRIEF DESCRIPTION OF THE DRAWINGS

Other characteristics and advantages of the invention will emerge during the following description, presented by way of non-limiting illustration and given with regard to the attached figures, which represent.

DESCRIPTION OF THE PREFERRED EMBODIMENTS

In the document as a whole, the terms "high-order bit" and "MSB" are equivalent, as are the terms "order" of the divider and "division order" of the divider.

Figure 1:
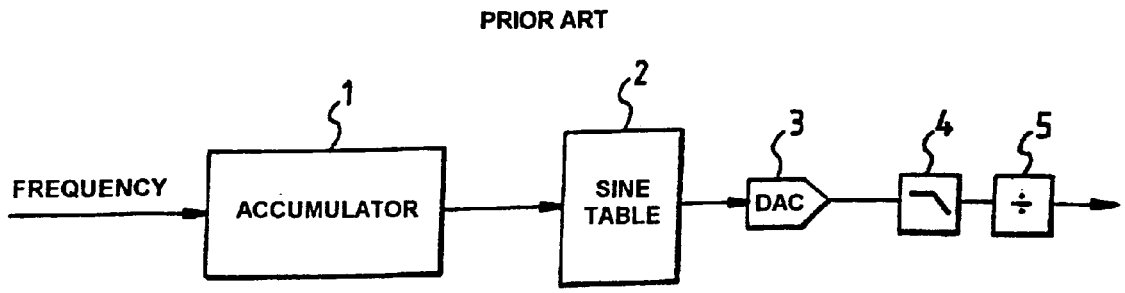
FIG. 1, an example embodiment of a device according to the prior art.

FIG. 1 represents, by a block diagram, a direct digital synthesizer according to the prior art. The synthesizer includes an accumulator 1, a table 2, a digital/analog converter 3, a filter 4 and a divider 5. The accumulator 1 derives a phase law from frequency information. The table 2 transforms the phase law into a sinusoidal digital signal. The table 2 may be a memory area addressed as a function of the value of the phase present at the output of the accumulator 1. The digital/analog converter 3 converts the sinusoidal digital signal into an analog signal. The filter 4 filters the output signal from the digital/analog converter 3 so as, in particular, to filter the spectral components introduced by the sampling. The divider 5 divides the filtered signal in order to enhance its spectral purity.

The spectrum of the signal, after filtering, exhibits numerous parasitic spectral lines. The main causes for the appearance of these spectral lines have been described above; these causes are inseparable from the process of digital/analog conversion. A first cause is due to the quantisation of the amplitude and a second cause is due to the non-linearities of the DAC. One known method for enhancing the spectral purity of the filtered signal is to divide the signal by means of the divider. However, the major drawback, as was mentioned above, lies in the loss of coherence because of the division.

Figure 2:
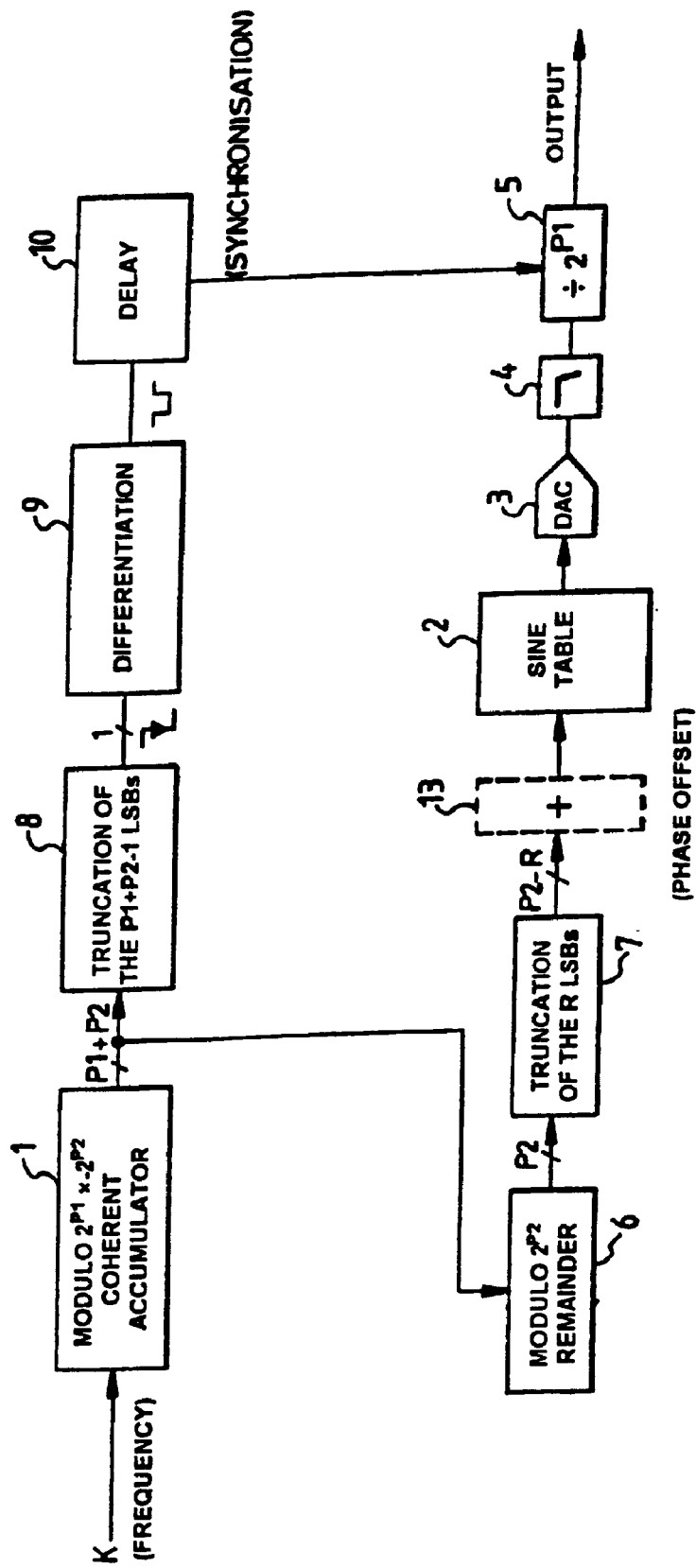
FIG. 2, a first embodiment of a device according to the invention.

FIG. 2, by a block diagram, represents a first embodiment of a direct digital synthesizer according to the invention.

As in the synthesizer of the prior art, the synthesizer according to the invention includes an accumulator 1, a table 2, a digital/analog converter 3, a filter 4 and a divider 5. The accumulator 1 derives a first phase law from frequency information; the table 2 transforms a second phase law derived from the first phase law into a sinusoidal digital signal; the digital/analog converter 3 converts the sinusoidal digital signal into an analog signal; the filter 4 filters the output signal from the digital/analog converter 3 so as, in particular, to filter the spectral components introduced by the sampling; the divider 5 divides the filtered signal in order to enhance its spectral purity.

Furthermore, the synthesizer includes truncation means 6, 7, 8, and means 9, 10 for generating a synchronization pulse, and the divider 5 is synchronizable.

The accumulator 1 is a binary phase coherent accumulator, the modulo of which is $M=2^{P1} \times 2^{P2}$. The accumulator 1 receives, as input, a word K which codes the desired frequency of the output signal of the synthesizer. The input bus of the accumulator 1 consists of P1+P2 bits. In this embodiment, the word K is coded over only P2 bits, the P2 low-order bits; the P1 high-order bits are set to zero. Consequently, K satisfies the relationship: $K \leq 2^{P2}-1$. P2 is usually chosen to be greater than P1. The output bus of the accumulator consists of P1+P2 bits. The P1+P2 bits code the phase of the signal to be generated. The phase law generated by the accumulator 1 corresponds to a signal the frequency F of which is given by the expression:

$$F = \frac{K}{2^{P1} \times 2^{P2}} F_H \tag{1}$$

in which $F_H$ is the frequency of a clock H signal.

Figure 3:
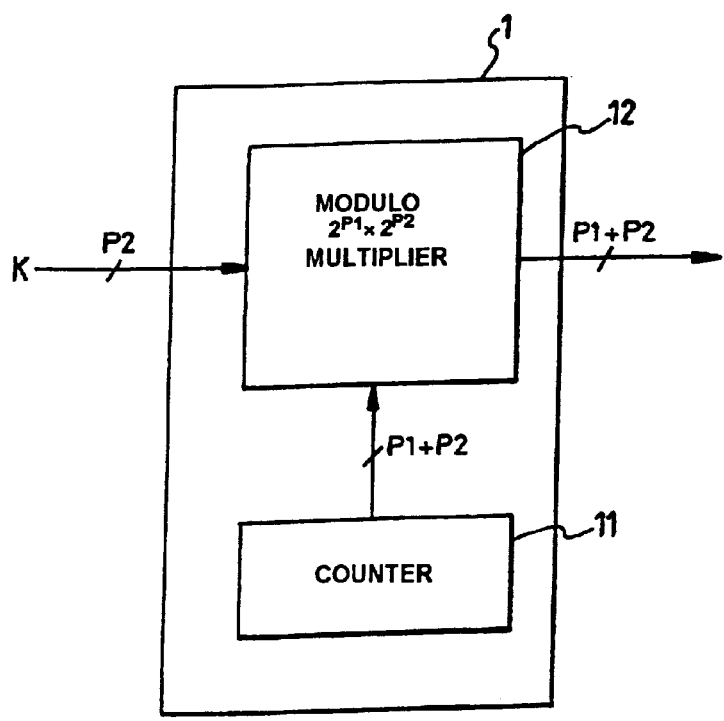
FIG. 3, an embodiment of a coherent accumulator included in the device of FIG. 2, FIG. 4, a table of the states of certain signals of the device of FIG. 3, in which the coherent accumulator has a given modulo M, FIG. 5a, a timing diagram of the phase states of the non-coherent divider of FIG. 1, FIG. 5b, a timing diagram of the phase states of the coherent divider of FIG. 4, FIG. 6, a second embodiment of a device according to the invention, FIG. 7, an embodiment of a coherent accumulator included in the device of FIG. 6.

FIG. 3 illustrates an embodiment of a coherent accumulator of modulo $M=2^{P1} \times 2^{P2}$. The accumulator 1 comprises a counter 11 and a multiplier 12. The counter 11 counts from 0 to $2^{P1} \times 2^{P2}-1$ in steps of one at the rate of a clock H. The output of the counter 11, coded over P1+P2 bits, constitutes one of the inputs of the multiplier 12. The second input of the multiplier 12 consists of the frequency set-point K, coded over P2 bits. The multiplier 12 multiplies its two inputs together, modulo $2^{P1} \times 2^{P2}$. The output of the multiplier 12 is the result RE of the multiplication; it is coded over P1+P2 bits. The operation performed is expressed by the following relationship:

$$RE=[K \times (\text{output of the counter})] \text{modulo}(2^{P1} \times 2^{P2}) \tag{2}$$

The output of the multiplier 12 corresponds to the output of the accumulator 1.

The truncation means 6, 7, 8 adapt the number of bits supplied by the accumulator 1, on the one hand, to the capacity of the table 2 and, on the other hand, to the means 9, 10 for generating a synchronization 35 pulse. The truncation means 6, 7, 8 can be broken down into a first means 6, a second means 7 and a third means 8.

The first means 6 takes into account the P1+P2 bits, coding the phase, supplied by the accumulator 1. The first means 6 calculates the remainder of the value of the phase modulo $2^{P2}$. This calculation amounts to not taking account of the P1 high-order bits. This calculation is equivalent to a multiplication by $2^{P1}$ of the phase law generated by the accumulator 1; which amounts to multiplying the frequency by $2^{P1}$. The signal supplied by the first means 6 has a frequency Fa given by the expression:

$$Fa = F \times 2^{P1} = \frac{K}{2^{P2}} F_H \qquad (3)$$

This signal is coded over P2 bits.

The second means 7 truncates by R bits the P2 bits supplied by the first means 6. This operation consists in not taking into account the R low-order bits. This truncation operation is conventional in the known digital synthesizers. This is because the tables 2 generally possess a number of address bits which is less than the number of bits of the accumulator 1. Address bits are spoken of, since the tables are generally set up in memories; a memory location being accessed via the address bits. The truncation does not alter the frequency Fa of the input signal. The frequency Fa of the signal at the output of the second means 7 is given by the expression (3). The output of the second means 7 addresses the table 2 with a number of bits equal to P2-R. On the other hand, the truncation operation generates parasitic signals. In order to get round this, a technique exists which consists in adding a random signal to the output signal from the accumulator 1.

The third means 8 extracts the high-order bit MSB, from the value of the phase at the output of the accumulator 1. The output signal of the third means 8 is obtained by a truncation by P1+P2−1 bits of the P1+P2 output bits of the accumulator 1. The MSB of the output bus of the accumulator 1 has a frequency Fs which is identical to that of the output signal of the synthesizer. In reality, the MSB is not "exactly" periodic as the description illustrates in connection with FIG. 4; the MSB contains non-harmonic frequencies. The MSB, on certain edges, exhibits a variable delay, lying between 0 and one period of the clock H, by comparison with a signal of frequency Fs. This variation is deterministic; it is a function of the ratio which exists between the value K of the frequency set-point and the value of the modulo $2^{P1} \times 2^{P2}$. Consequently, it can be compensated for; the compensation forms the subject of a variant of the device.

Table 2 transforms the phase law into a sinusoidal digital signal. Table 2 converts the phase samples into amplitude samples. Having regard to the symmetries of the sine function, table 2 can contain only a quarter of a period of the sine function. The two high-order bits of the input bus, with P2-R bits, are used to reconstitute the whole of the period according to a process known to the person skilled in the art.

The digital/analog converter 3 converts the sinusoidal digital signal, output from table 1, into an analog signal.

The filter 4 filters the output signal from the digital/analog converter 3 so as, in particular, to filter the spectral components due to the sampling. At the output of the filter 4, the sinusoidal analog signal has a frequency Fa given by relationship (3). The filter 4 introduces, into the output signal, a phase variation which is a function of the frequency. This phase variation can be broken down into:

a linear variation, a phase offset independent of the frequency, a residual variation dependent on the frequency.

An adder 13 is represented in dashed lines in FIG. 2. It is inserted between the second truncation means 7 and the table 2. The adder 13 makes it possible to compensate for the offset. This arrangement is the subject of a variant to the invention.

The adder 13 can also be incorporated into the table 2 in the form of the offset being taken into account in the stored values.

The means 9, 10, for generating a synchronization pulse generate a synchronization pulse from the output signal from the third truncation means 8. The synchronization pulse synchronizes the synchronizable divider 5. The means 9, 10 can be broken down into a first means 9 and a second means 10 for generating a pulse.

The first means 9 preferably performs a differentiation of the output signal of the third truncation means 8. The first means 9 may consist of a J-K flip-flop. The differentiation makes it possible to obtain a pulse, at the output of the first means 9, which is triggered by an edge; in the example adopted, this is the falling edge of the output signal of the third truncation means 8. The falling edge corresponds to the instant t, synchronous with the clock H, at which the content of the accumulator becomes greater than or equal to the modulo of the accumulator. In the example, this modulo is chosen to be equal to $2^{P1} \times 2^{P2}$. That is to say that at the preceding clock beat, i.e. at $t-t_H$, the content of the accumulator has a value A. And, after addition of the value K at the instant t, the content of the accumulator has a value B given by the relationship: $B \geq A+K$ and $B \geq$ value of the modulo, i.e.: $A+K \geq 2^{P1} \times 2^{P2}$.

Figure 4:
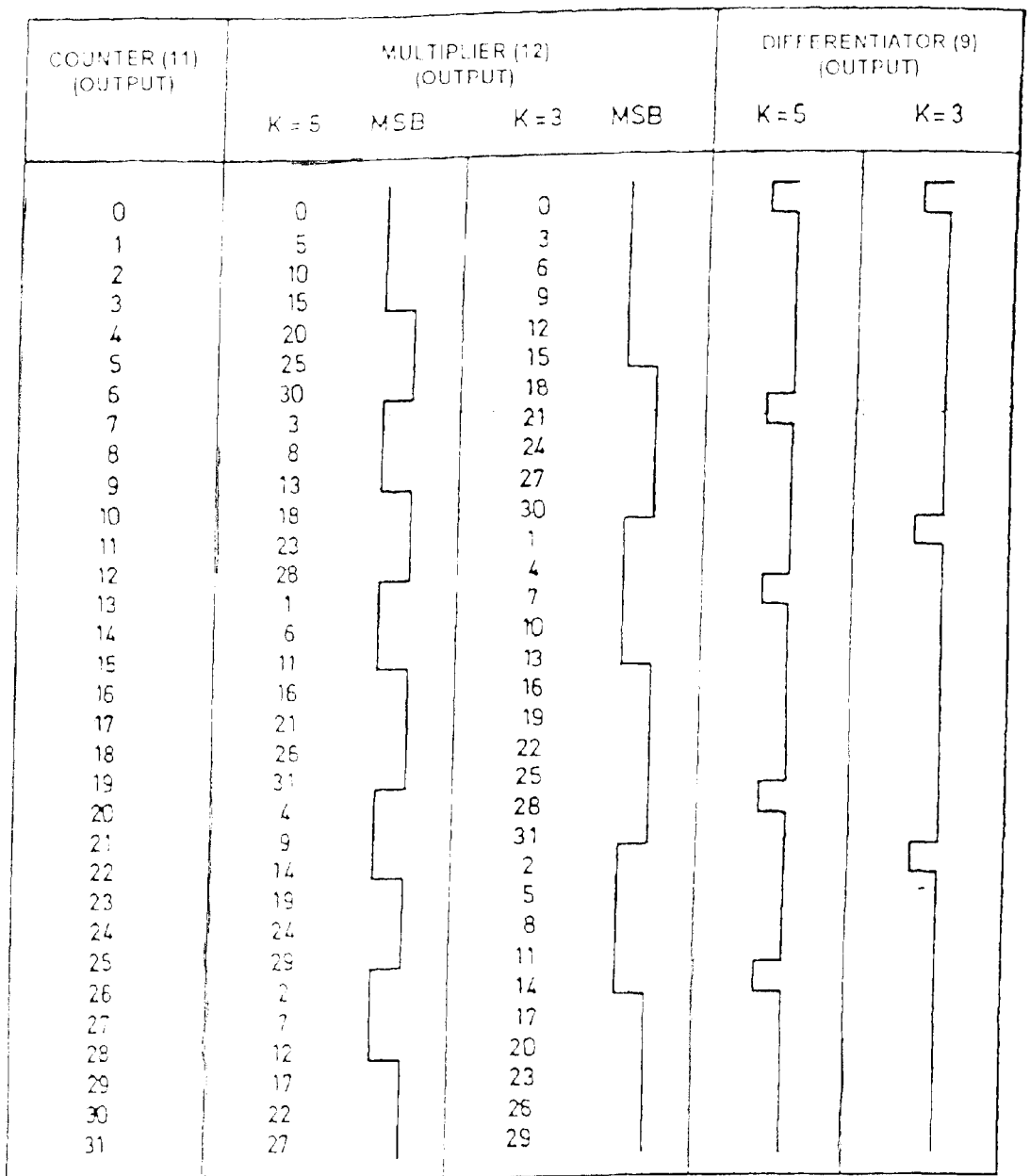

The table of FIG. 4 illustrates the values taken by various outputs of means of the device for a modulo of the counter 11 taken to be equal to $2^{P1} \times 2^{P2} = 32$, with P1=1 and P2=4. The first column of the table contains the values taken by the output of the counter 11. The output changes progressively between 0 and 31 at the rate of the clock H. The second column contains the values taken by the output of the multiplier 12 as well as the state of the MSB of this output, this for two different frequencies. The first frequency $F_1$, has the value K=5 and the second frequency $F_2$ has the value K=3. The third column contains the values taken by the output of the differentiator 9, this for each of the preceding frequencies. In accordance with what was described above, the MSB output bit of the multiplier 12 has the same frequency as the output signal of the synthesizer; i.e. $F_1$ for K=5, and $F_2$ for K=3. Furthermore, the MSB output bit of the multiplier 12 is coherent since it is reset to zero synchronously with the counter 11. Given the way in which the output pulse of the differentiator 9 is generated, this pulse is also coherent, like the MSB, and it has the same frequency as the MSB bit.

The second means 10 has the function of compensating for certain delays. The compensation comprises an integral number of clock beats to which is added a fractional part of a clock beat which can be produced in analog mode. The delays originate mainly:

from the pipeline differential between the synchronization channel, which comprises the means 8 and 9, and the channel for synthesis of the signal, which comprises the truncation means 6 and 7, the adder 13, the table 2 and the DAC 3, from the linear phase variation introduced by the filter 4, from the delay of certain edges of the MSB the value of which lies between 0 and one period of the clock H.

The compensation for the delay is controlled by way of a set-point value. This can be derived, for example, on the basis of the following information:

the content of the accumulator when the MSB bit changes to 1, the frequency set-point value K of the synthesizer.

The synchronizable divider 5 divides the output signal of the filter 4, preferably by a power of two, this signal having a frequency Fa. Dividers by a power of two are readily available; they are frequently used. In order to carry out division by two, it is usual to use a D-type flip-flop the Q output of which is looped back onto the D input. Under these conditions, the signal on the Q output is a division by two of the signal which feeds the clock input of the flip-flop.

The use of an odd divider, or of an even divider the value of which is not a power of two, corresponds to other embodiments for which a few adaptations are necessary. These adaptations are minor; they may, for example, consist of adaptations of counters.

At the output of the divider 5, the divided signal has a frequency $F_s=F$, with F given by the relationship (1). The divider 5 divides the output of the filter 4 by $2^{P1}$. The division causes the synthesizer to lose coherence. This is because a divider by $2^{P1}$ possesses P1 phase states which proceed at the rate of the input frequency of the divider; the input signal driving the clock input of the divider as in the example of the D-type flip-flop quoted above.

Figure 5A:
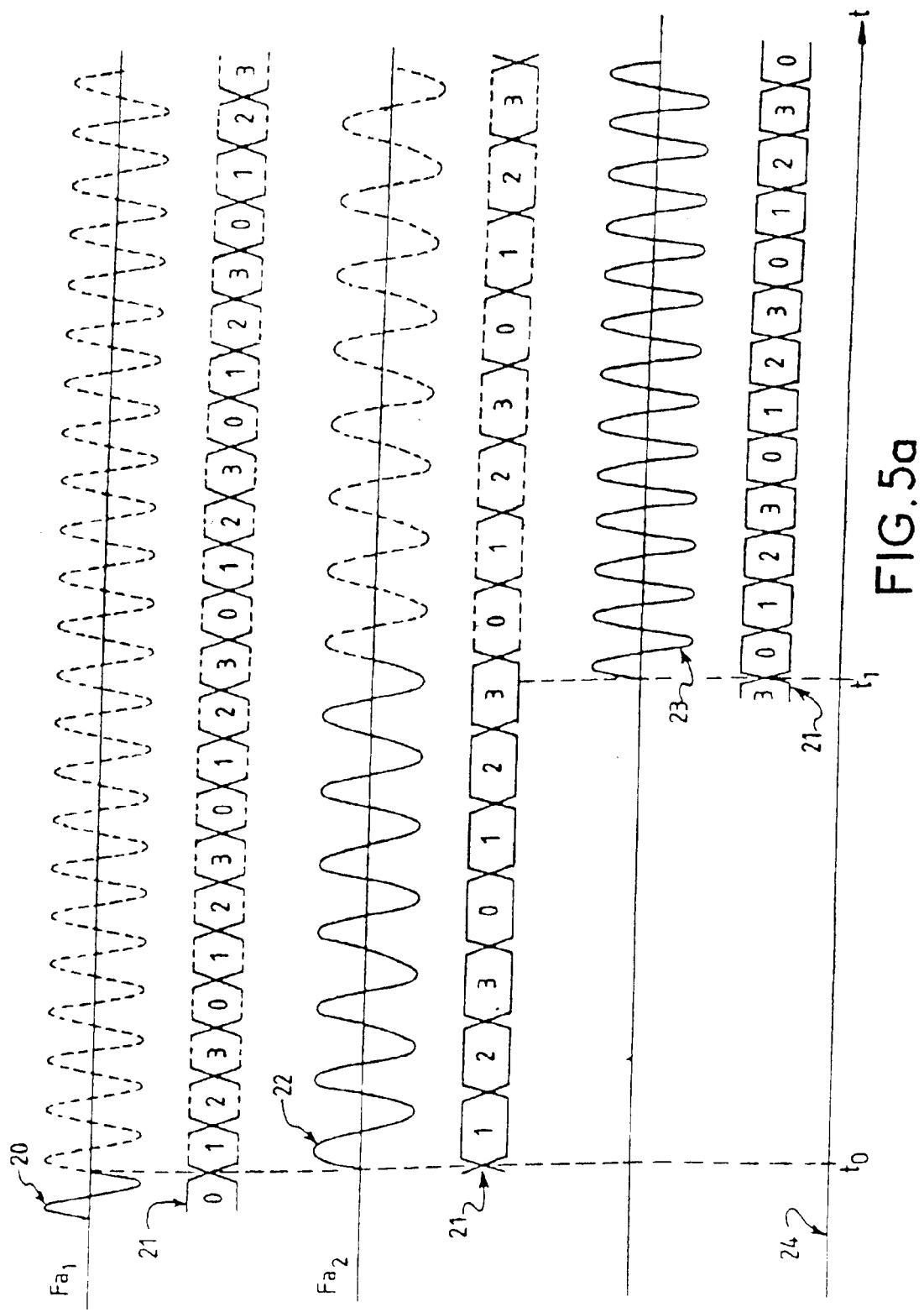
Figure 5B:
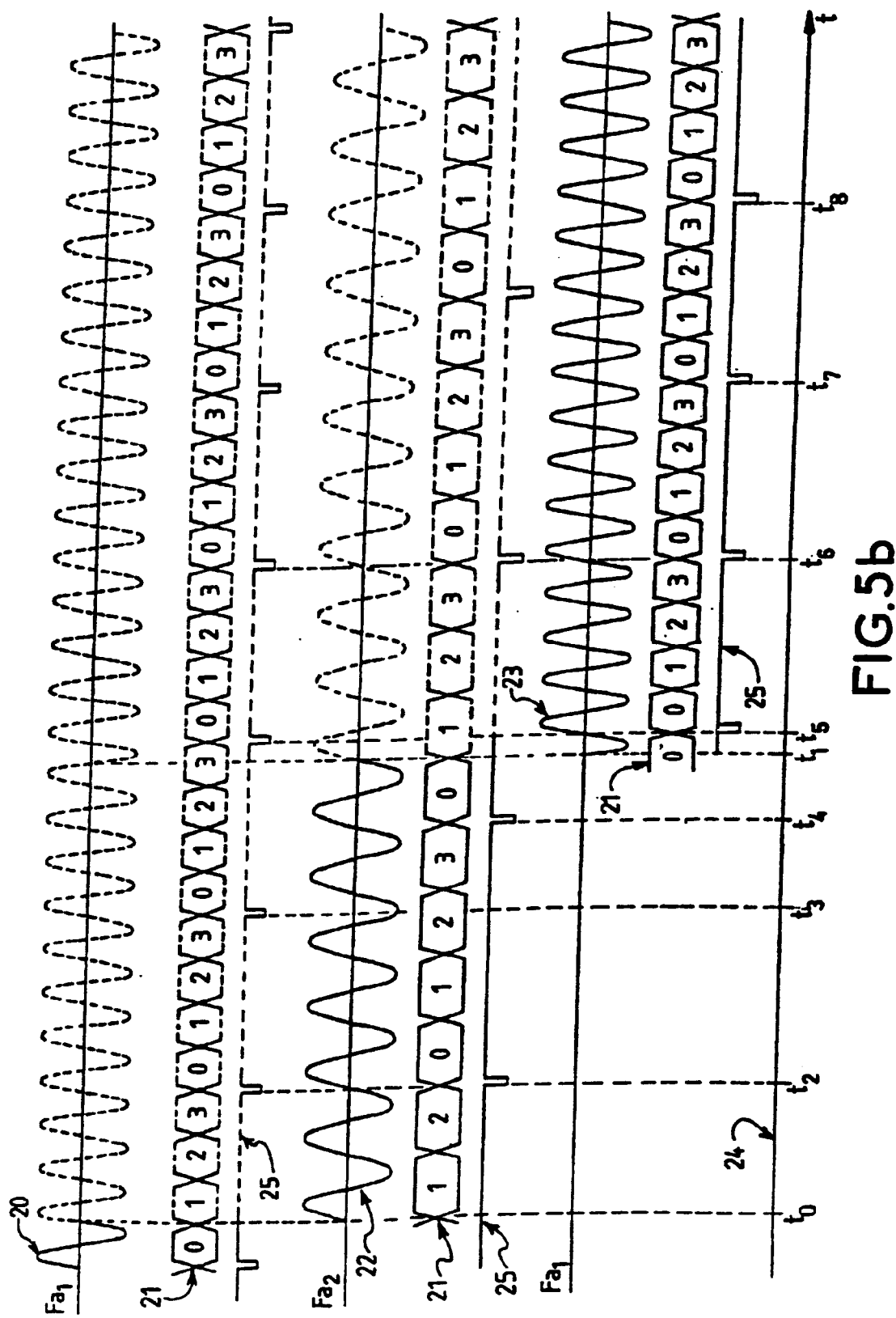

FIGS. 5a and 5b represent timing diagrams of a division by four without coherence and of a division by four with coherence. FIG. 5a is a timing diagram of the phase states of the non-coherent divider of FIG. 1. FIG. 5b is a timing diagrams of the phase states of the coherent divider of FIG. 4.

In the case of the division without coherence, FIG. 5a, the input signal of the divider is assumed to be derived from a coherent accumulator. Thus, after a second change of frequency in order to come back to the initial frequency, the input signal of the divider again becomes identical to what it was before the two frequency changes. The clock input of the divider has a frequency $Fa=F \times 2^{P1}$, in the case in which the divider is dividing by $2^{P1}$. The signal 20 represents the clock input of the divider 5 when the frequency set-point at the input of the device is equal to $F_1$; the signal 20 has a frequency $Fa_1$. The signal 21 represents the phase states of the divider 5. In this example, the divider 5 is performing division by four. The divider 5 thus includes four phase states, denoted 0 to 3, which follow each other at the rate of its clock input. The signal 22 represents the clock input of the divider 5 when the frequency set-point at the input of the device is equal to $F_2$; the signal 22 has a frequency $Fa_2$. The signal 23 represents the clock input of the divider 5 when the frequency set-point at the input of the device is again equal to $F_1$. The signal 24 represents the time scale.

Before the instant t0, the output signal has a frequency $F_1$, the signal at the input of the divider 5 has a frequency $Fa_1$, and it is represented by the signal 20.

At the instant $t_0$, the frequency set-point K changes so that the output signal has a frequency $F_2$. The clock input of the divider is represented by the signal 22. The signal 20 is continued in dashed line beyond $t_0$. The phase states of the divider evolve continuously, but at the rate of the frequency $Fa_2$ after the instant $t_0$.

At the instant $t_1$, the frequency set-point K changes so that the output signal again has a frequency $F_1$. The clock input of the divider is represented by the signal 23. The signal 22 is continued in dashed line beyond $t_1$. The input signal of the divider is assumed to be derived from a coherent accumulator. At the second frequency change, which allows a return to the initial frequency, the signal 23 takes the form which the signal 20 would have had if no frequency change had taken place; a break in phase generally exists at the instant $t_1$, between the signals 22 and 23. In contrast, the phase states of the divider evolve continuously, but at the rate of the frequency $Fa_1$ after the instant $t_1$. The comparison of the phase states 21 of the divider, after the instant $t_1$, illustrates the loss of coherence after a change of frequency. After the instant $t_1$, the phase states of the divider can be different from the phase states represented in dashed line below the signal 20, which the divider would have had if the frequency had not been changed. By changing frequency, the phase states of the divider progress at a different speed; this destroys the coherence since, upon a return to the initial frequency, no information allows the divider to resume its phase cycle as if there had been no change of frequency.

The usual dividers do not, in general, provide the signals describing the phase states of the divider; in the case of a divider by $2^{P1}$, no signal describes the P1 phase states. In contrast, the usual dividers generally possess a zero-reset input. The synchronization pulse, generated by the means 9, 10 for generating a synchronization pulse, drive the zero-reset input of the divider, so as to impose the instant of the zero state of the synchronizable divider 5. Upon a change of frequency, the zero-reset pulse makes it possible to place the phase cycle of the divider 5 correctly by imposing the instant of the phase zero of the divider 5.

FIG. 5b represents the phase states of a divider by four, of a device according to the invention, to which a change of frequency then a return to the initial frequency $F_1$ are applied. When the frequency is steady, the synchronization pulse falls during the zero-phase instant of the divider; this pulse has no effect. At a defined instant, the frequency is altered and changes from $F_1$, to $F_2$. The frequency change alters the duration of the phase states of the divider. The signal at the input of the divider, of initial frequency $Fa^1$, is continued in dashed line during the time when the frequency is $Fa_2$. In contrast to the known devices, the phase cycle of the divider 5 no longer depends on the history of the frequency changes but on the phase of the MSB signal which is itself coherent; the MSB signal making it possible to generate the synchronization pulse.

FIG. 5b illustrates how the output signal of the synthesizer is kept coherent despite a change of frequency. The signal 20 represents the clock input of the divider 5 when the frequency set-point at the input of the device is equal to $F_1$; the signal 20 has a frequency $Fa^1$ given by equation (3). The signal 21 represents the phase states of the divider 5. The divider 5, in this example, performs division by four. The divider 5 thus includes four phase states, denoted from 0 to 3, which follow each other at the rate of its clock input. The signal 22 represents the clock input of the divider 5 when the frequency set-point at the input of the device is equal to $F_2$; the signal 22 has a frequency $Fa_2$ given by equation (3). The signal 23 represents the clock input of the divider 5 when the frequency set-point at the input of the device is again equal to $F_1$. The signal 24 represents the time scale. The signal 25 is an illustration of the synchronization signal of the divider 5. In the steady-state regime, the synchronization signal 25 has the same frequency as the output signal of the synthesizer. In the example, the frequency of the synchronization signal is equal to $Fa_1/2^2$ up to $t_0$ then $Fa_2/2^2$ between $t_0$ and $t_1$, then $Fa_1/2^2$ again beyond $t_1$. In the steady-state regime, the synchronization pulse falls at the same time as the zero state of the divider 5; for example at the instants $t_2$, $t_3$, $t_4$, $t_6$, $t_7$ and $t_8$.

Before the instant t0, the output signal has a frequency $F_1$, the signal at the input of the divider 5 has a frequency $Fa_1$ and it is represented by the signal 20.

At the instant $t_0$, the frequency set-point K changes so that the output signal has a frequency $F_2$. The clock input of the divider is represented by the signal 22. The signal 20 is continued in dashed line beyond $t_0$. Below the signal 20, the phase states 21 of the divider and the synchronization signal 25 are continued in dashed line beyond to as if the set-point K had not been altered. After the instant $t_0$, the output signal of the filter 4 changes frequency, the frequency becomes equal to $Fa_2$. The phase states of the divider evolve continuously, but at the rate of the frequency $Fa_2$ after the instant $t_0$.

At the instant $t_1$, the frequency set-point K changes so that the output signal again has a frequency $F_1$. The clock input of the divider is represented by the signal 23. The signal 22 is continued in dashed line beyond $t_1$. Below the signal 22, the phase states 21 of the divider and the synchronization signal 25 are continued in dashed line beyond $t_1$ as if the set-point K had not been altered. After the instant $t_1$, the output signal of the filter 4 changes frequency, the frequency again becomes equal to $Fa^1$. However, with the signal 23 being derived from the coherent accumulator 1, the signal 23 is coherent. Hence, at the instant $t_1$, there is generally a break in phase of the output signal of the filter 4 in such a way that the signal 23 is identical to the signal 20 continued in dashed line. The phase states of the divider evolve continuously, but at the rate of the frequency $Fa^1$ after the instant $t_1$. In contrast, at the instant $t_5$, there is a break in the phase states 21. This break is caused by the synchronization pulse 25 which arrives at this instant $t_5$. This break in the phase states 21 causes a return to the phase state which the divider would have exhibited at the instant $t_5$ if the signal 20 had not been interrupted at the instant $t_0$. In a conventional device, there is no synchronization pulse at the instant $t_5$; the phase states 21 evolve continuously whatever the changes of frequency. In a device according to the invention, at the instant $t_5$, the phase states again become those which would have continued after $t_0$ if there had not been a change of frequency at the instants $t_0$ and $t_1$. The time lying between the instants $t_1$, and $t_5$ corresponds to one transition period. The duration of this period depends:

on the frequency $F_1$,
on the instant $t_1$ at which the change of frequency occurs.
This duration is less than one period of the frequency $F_1$.

It should be stated that this transient period also exists during the first change of frequency, after the instant $t_0$. However, that does not emerge from FIG. 5b.

Beyond the instant $t_5$, the output signal of the divider is coherent with the output signal of the divider present before the instant $t_0$, and this despite the alteration in frequency which occurred between the instants to and $t_1$. The frequency regime of the output signal of the synthesizer is steady; synchronization pulses arriving after the instant $t_5$ have no effect; they fall during the zero state of the divider 5.

This coherent division makes it possible to optimize the spectral-purity characteristics of the synthesizer.

Figure 6:
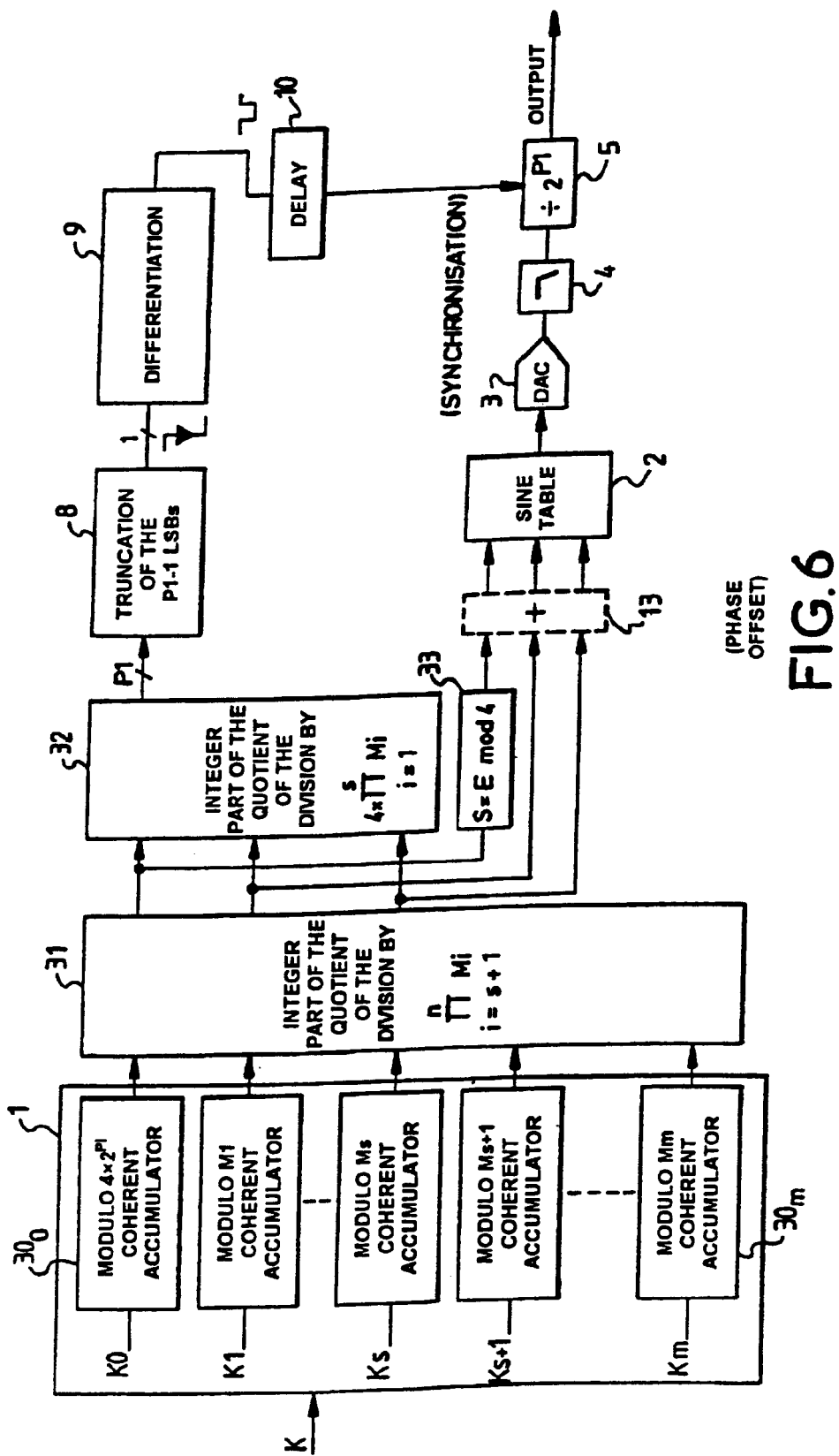

By way of alternative to a coherent accumulator in which the number of bits is large, it is possible to use coherent accumulators of smaller size, by breaking up the initial coherent accumulator into small coherent accumulators. The use of several small accumulators makes it possible advantageously to reduce the consumption of the synthesizer. FIG. 6 gives a representation of such an alternative in a device according to the invention. The device comprises elements which are identical to the device described with regard to FIG. 2. These elements have the same reference number; they will not be described again.

The device implements residue algebra; this algebra is better known by the title RNS, the abbreviation of the terms Residues Number System. The article by W. A. Chren, "One-Shot Residue Coding for Low Delay-Power Product CMOS Design" under the reference IEEE TRANSACTIONS ON CIRCUITS AND SYSTEMS-II: ANALOG AND DIGITAL SIGNAL PROCESSING, Vol. 45, No. 3, MARCH 1998, gives a description of this system. The accumulator 1 of FIG. 2 is replaced, in this embodiment, by several accumulators $30_i$ of small size. Each accumulator $30_i$ has modulo Mi; the accumulator $30_0$, preferably having a modulo $4.2^{P1}$, in the case in which the synchronizable divider 5 were to have a division order equal to $2^{P1}$. In the case in which the order of division of the synchronizable divider 5 were odd, the accumulator $30_0$ is separated into two accumulators: a first modulo-4 accumulator and a second accumulator with modulo equal to the division order. If the modulo of this second accumulator is not prime to the other modulos Mi, it has to be broken down into its prime factors. And it is necessary to distribute these various factors, combining them with the various modulos Mi, so as to respect the condition of obtaining mutually prime accumulators. For example, the division order of the synchronizable divider is equal to 15. The accumulator $30_0$ is separated into a modulo-4 accumulator and a modulo-15 accumulator. If the modulos M1, M2 and M3 are equal to 3, 5 and 7 respectively, and given that 15=3×5, then the factors 3 and 5 are distributed. The factor 3 is grouped together with the modulo M1 and the factor 5 is grouped together with the modulo M2. Finally, the modulos Mi to be taken into account are as follows: M0=4, M1=9, M2=25 and M3=7.

The various modulos $4.2^{P1}$, M1, . . . , Mm are all mutually prime; that is to say that, for any two modulos Mj and Mk, from the list of modulos $4.2^{P1}$, M1, . . . , Mm, the only divider common to Mj and Mk is 1. The control word Ki at the input of each accumulator $30_i$ is equal to the remainder of the division of the frequency word K by the modulo of the corresponding accumulator. The set of outputs of the accumulators $30_i$ represents the phase of the signal in the basis of modulos ($4.2^{P1}$, M1, . . . , Mm). The choice of mutually prime modulos makes it possible unambiguously to represent a number of phase states equal to the product of the modulos, that is to say $(4 \times 2^{P1}) \times (M1) \times \ldots (Mm)$. In the first embodiment of the invention, the number of phase states is equal to $2^{P1} \times 2^{P2}$.

Table 2 generally possesses a phase resolution lower than that defined by the set of accumulators. In this case, it is necessary to carry out a truncation operation which consists in passing from a representation of the phase on the basis of modulos ($4.2^{P1}$, M1, . . . , Mm) to a representation on the basis of modulos ($4.2^{P1}$, M1, . . . , Ms) with s<m. This operation is equivalent to a division of the phase word by the product M(s+1)×M(s+2)× . . . ×Mm. The device comprises a first division unit 31 for carrying out this truncation. The output signal of the first division unit 31 is the integer part of the quotient, represented over the remaining modulos. This imposes a new restriction on the choice of the modulos: each modulo from M(s+1) to Mm has to exhibit an inverse for each of the remaining modulos from $4.2^{P1}$ to Ms, in order to make the division operation possible. The output of the first division unit 31 is represented on the basis of modulos ($4.2^{P1}$, M1, . . . , Ms). The device comprises a second division unit 32. This second unit 32 carries out a division by the product 4×M1×M2× . . . ×Ms in order to be able to represent the signal solely on the modulo $2^{P1}$. The output signal of this division is consequently a signal over P1 bits. A third truncation means 8 performs the extraction of the MSB bit from the output of the second unit 32. This extraction has been described with regard to FIG. 2. A first means 9 for generating a synchronization pulse preferably carries out a differentiation of the output signal of the third truncation means 8 as in the first embodiment of the invention. The second means 10 for generating a synchronization pulse has the function of compensating for certain delays as in the first embodiment of the invention. The device comprises a multiplier operator 33. This operator 33 multiplies the frequency of the signal by $2^{P1}$. The multiplication bears solely on the first modulo ($4 \times 2^{P1}$). The output signal of the operator 33 is the remainder modulo 4 of the input signal of the operator 33. The signal, at the input of table 2, is represented on basis of modulos (4, M1, . . . , Ms). The modulo 4 of this basis makes it possible to save on hardware for the coding of the sine. This is because it is sufficient to code one quarter of a sine period and to use the symmetries to reconstitute the whole of the sinusoid. By choosing to use modulo 4 for this purpose, and by choosing to divide by a power of two at the output of the DAC, it becomes necessary to group these two factors, 4 and $2^{P1}$, together in the same accumulator. Otherwise the condition according to which the modulos of the accumulators are mutually prime is not satisfied; a modulo 4 is not prime to a modulo $2^{P1}$. The grouping together of the modulos 4 and $2^{P1}$ in the same accumulator leads to the embodiment described above. Other embodiments are possible; for example embodiments which do not use the symmetries of the sine or, for example, embodiments in which the order of the divider is an odd number.

Figure 7:
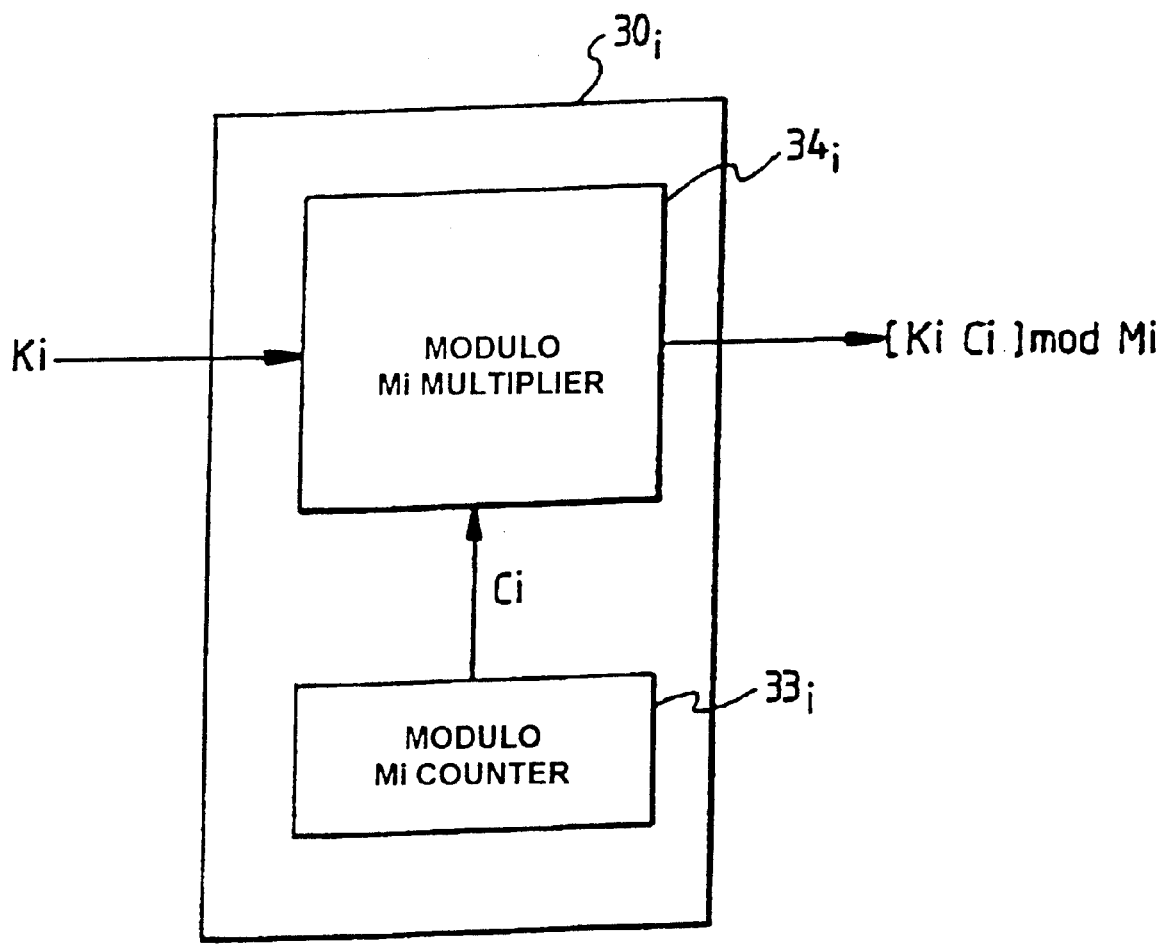

FIG. 7 illustrates an embodiment of a coherent accumulator $30_i$ of modulo Mi, of the device of FIG. 6. The accumulator $30_i$ comprises a counter $33_i$ and a multiplier $34_i$. The counter $33_i$ counts from 0 to Mi−1 in steps of one at the rate of a clock H. The output Ci of the counter $33_i$ constitutes one of the inputs of the multiplier $34_i$. The second input of the multiplier 34i consists of the frequency set-point Ki. The multiplier $34_i$ multiplies its two inputs together, modulo Mi. The output of the multiplier $34_i$ is the result Ri of the multiplication. The operation performed is expressed by the following relationship:

$$Ri = [Ki \times (Ci)] \bmod (Mi) \quad (4)$$

in which the relationship (2) is a particular application.

The output of the multiplier $34_i$ corresponds to the output of the accumulator $30_i$.

What is claimed is:

1. Direct digital frequency-synthesis device, comprising:
    a modulo-M coherent accumulator, for generating a first phase law from a frequency-control word,
    a table, addressed by a second phase law derived from the first phase law, for generating a digital sinusoidal signal,
    a digital/analog converter for converting the digital sinusoidal signal into an analog sinusoidal signal,
    a filter for filtering the analog sinusoidal signal,
    and a divider, of a defined order of magnitude, for dividing the filtered signal,
    wherein the divider is of lower order than M and has a synchronization input driven by a synchronization pulse for re-synchronizing the filtered signal after division, the timing of the synchronization pulse based on the first phase law.

2. Device according to claim 1, further comprising means for generating the synchronization pulse from a high-order bit of the first phase law originating from the coherent accumulator.

3. Device according to claim 1, wherein the coherent accumulator includes:
    a counter for modulo-M counting, and
    a multiplier for multiplying the frequency-control word with an output value of the counter wherein a result of the multiplication defines the first phase law.

4. Device according to claim 1, wherein for addressing the table, further comprising:
    first means for multiplying the first phase law by an order ($2^{P1}$) of the divider, and
    second means for truncating a result of the multiplication carried out by the first means to adapt the multiplication result to a capacity of the table.

5. Device according to claim 4, wherein the coherent accumulator has a modulo of $M = 2^{P1} \times 2^{P2}$, and the order of the divider is $2^{P1}$.

6. Device according to claim 1, wherein the coherent accumulator is made up of plural coherent accumulators of modulo Mi and implements residue number system (RNS), and the modulos Mi are all mutually prime.

7. Device according to claim 6, wherein a control word at an input of each accumulator is equal to a remainder of a division of the frequency-control word by the modulo Mi of the corresponding accumulator.

8. Device according to claim 6, wherein a coherent accumulator of the plurality of coherent accumulators has a modulo equal to $4 \times 2^{P1}$ and an order of magnitude of the divider is equal to $2^{P1}$.

9. Device according to claim 8, further comprising a first division unit for adapting a representation of the phase on a first basis ($4 \times 2^{P1}$, M1, . . . , Mm) to a representation on a second basis ($4 \times 2^{P1}$, M1, . . . , Ms) with s<m, representative of a size of the table, and each modulo from M (s+1) to Mm exhibits an inverse for each of the remaining modulos, from $4 \times 2^{P1}$ to Ms.

10. Device according to claim 9, further comprising a second division unit for adapting a representation of a phase on the first basis ($4 \times 2^{P1}$, M1, . . . , Mm) to a representation of phase on a third basis of a modulo equal to the order ($2^{P1}$) of the divider.

11. Device according to claim 10, further comprising means for generating the synchronization pulse from a high-order bit of the representation of the phase based on the modulo equal to the order of the divider ($2^{P1}$).

12. Device according to claim 1, further comprising means for delaying the synchronization pulse in order to compensate for temporal variations between a filtered signal and the synchronization pulse.

* * * * *